United States Patent
Weimin et al.

(10) Patent No.: US 11,548,547 B2
(45) Date of Patent: Jan. 10, 2023

(54) HIGHLY INTEGRATED EPS SYSTEM

(71) Applicant: Steering Solutions IP Holding Corporation, Saginaw, MI (US)

(72) Inventors: Yin Weimin, Jiangsu (CN); Kun Yang, Jiangsu (CN); Pierre C. Longuemare, Paris (FR); Eric Pattok, Frankenmuth, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 322 days.

(21) Appl. No.: 16/862,745

(22) Filed: Apr. 30, 2020

(65) Prior Publication Data

US 2020/0361522 A1 Nov. 19, 2020

Related U.S. Application Data

(60) Provisional application No. 62/848,829, filed on May 16, 2019.

(51) Int. Cl.
*B62D 5/04* (2006.01)
*B62D 15/02* (2006.01)
*B62D 6/10* (2006.01)

(52) U.S. Cl.
CPC ......... *B62D 5/0409* (2013.01); *B62D 5/0406* (2013.01); *B62D 5/0454* (2013.01); *B62D 15/0235* (2013.01); *B62D 6/10* (2013.01)

(58) Field of Classification Search
None
See application file for complete search history.

(56) References Cited

U.S. PATENT DOCUMENTS 9,097,559 B2 * 8/2015 Ronnat ............... G01D 5/2458
2011/0088488 A1 * 4/2011 Maehara ............... B62D 6/10
73/862.333

(Continued)

FOREIGN PATENT DOCUMENTS

CN 101400972 A 4/2009
CN 102712341 A 10/2012

(Continued)

OTHER PUBLICATIONS

First Office Action regarding corresponding CN App. No. 202010418921.5; dated Mar. 2, 2022.

*Primary Examiner* — Jacob D Knutson
*Assistant Examiner* — Ryan Edward Hardy
(74) *Attorney, Agent, or Firm* — Dickinson Wright PLLC

(57) ABSTRACT

Technical solutions for a motor assembly for an electric power steering system are provided. The motor assembly comprises a motor configured to rotate a motor shaft to apply a drive torque to an output shaft of a steering column. The motor assembly also comprises a circuit card assembly including a torque and angle sensor disposed upon a printed circuit board and configured to measure a differential angle between rotational positions of the output shaft and an input shaft. The printed circuit board of the circuit card assembly is disposed perpendicular to a rotational axis of the steering column. The motor assembly also comprises an enclosure coupled to the motor and containing the circuit card assembly and a worm shaft coupled to rotate with the motor shaft and having a worm disposed helically thereabout for driving a worm gear coupled to the output shaft.

15 Claims, 5 Drawing Sheets

(56) References Cited

U.S. PATENT DOCUMENTS

2018/0106693 A1* 4/2018 Pattok .................. B62D 5/0406
2019/0245411 A1* 8/2019 Strieter ................ H02K 7/1004

FOREIGN PATENT DOCUMENTS

| CN | 106536327 A | 3/2017 | |
|----|----|----|----|
| CN | 106573648 A | 4/2017 | |
| CN | 108349526 A | 7/2018 | |
| CN | 108698640 A | 10/2018 | |
| DE | 102005007357 A1 * | 9/2005 | ........... B62D 5/0406 |
| WO | 2013079399 A1 | 6/2013 | |
| WO | WO-2014178084 A2 * | 11/2014 | ........... B62D 5/0406 |
| WO | WO-2017072217 A1 * | 5/2017 | ......... B62D 15/0215 |

* cited by examiner

HIGHLY INTEGRATED EPS SYSTEM

CROSS-REFERENCE TO RELATED APPLICATIONS

This patent application claims priority to U.S. Provisional Patent Application Ser. No. 62/848,829, filed May 16, 2019, the disclosure of which is incorporated herein by reference in its entirety.

BACKGROUND

The present application is generally related to a motor for an electric power steering (EPS) system and, more particularly, an integrated control system for a torque sensor, an angle sensor, and a motor position sensor.

Motor assemblies, and especially motor assemblies for EPS systems that include a brushless motor, can be relatively large and present packaging challenges. EPS systems generally also include torque and angle sensors that must be accommodated in the mechanical packaging of the EPS system. The combination of large size motor assemblies and separate sensors can interfere with other vehicle components, resulting in limited positioning options, little to no versatility from one platform type to another, high cost, and complex installation.

SUMMARY

According to one or more embodiments, a motor assembly for an electric power steering system comprises a motor configured to rotate a motor shaft to apply a drive torque to an output shaft of a steering column. The motor assembly also comprises a circuit card assembly including a torque and angle sensor disposed upon a printed circuit board. The torque and angle sensor is configured to measure a differential angle between rotational positions of the output shaft and an input shaft. The printed circuit board of the circuit card assembly is disposed perpendicular to a rotational axis of the steering column.

According to one or more embodiments, a motor assembly for an electric power steering system comprises a motor configured to rotate a motor shaft to apply a drive torque to an output shaft of a steering column. The motor assembly also comprises an enclosure coupled to the motor and containing a circuit card assembly, the circuit card assembly includes a torque and angle sensor disposed upon a printed circuit board. The torque and angle sensor is configured to measure a differential angle between rotational positions of the output shaft and an input shaft. The motor assembly also comprises a worm shaft coupled to rotate with the motor shaft, the worm shaft having a worm disposed helically thereabout for driving a worm gear coupled to the output shaft. The worm shaft and the worm gear are each disposed within the enclosure.

According to one or more embodiments, a motor assembly for an electric power steering system comprises a motor configured to rotate a motor shaft to apply a drive torque to an output shaft of a steering column. The motor assembly also comprises a circuit card assembly including a torque and angle sensor disposed upon a printed circuit board. The torque and angle sensor is configured to measure a differential angle between rotational positions of the output shaft and an input shaft. The circuit card assembly also includes a position sensor disposed upon the printed circuit board and configured to measure a rotational position of the motor shaft.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
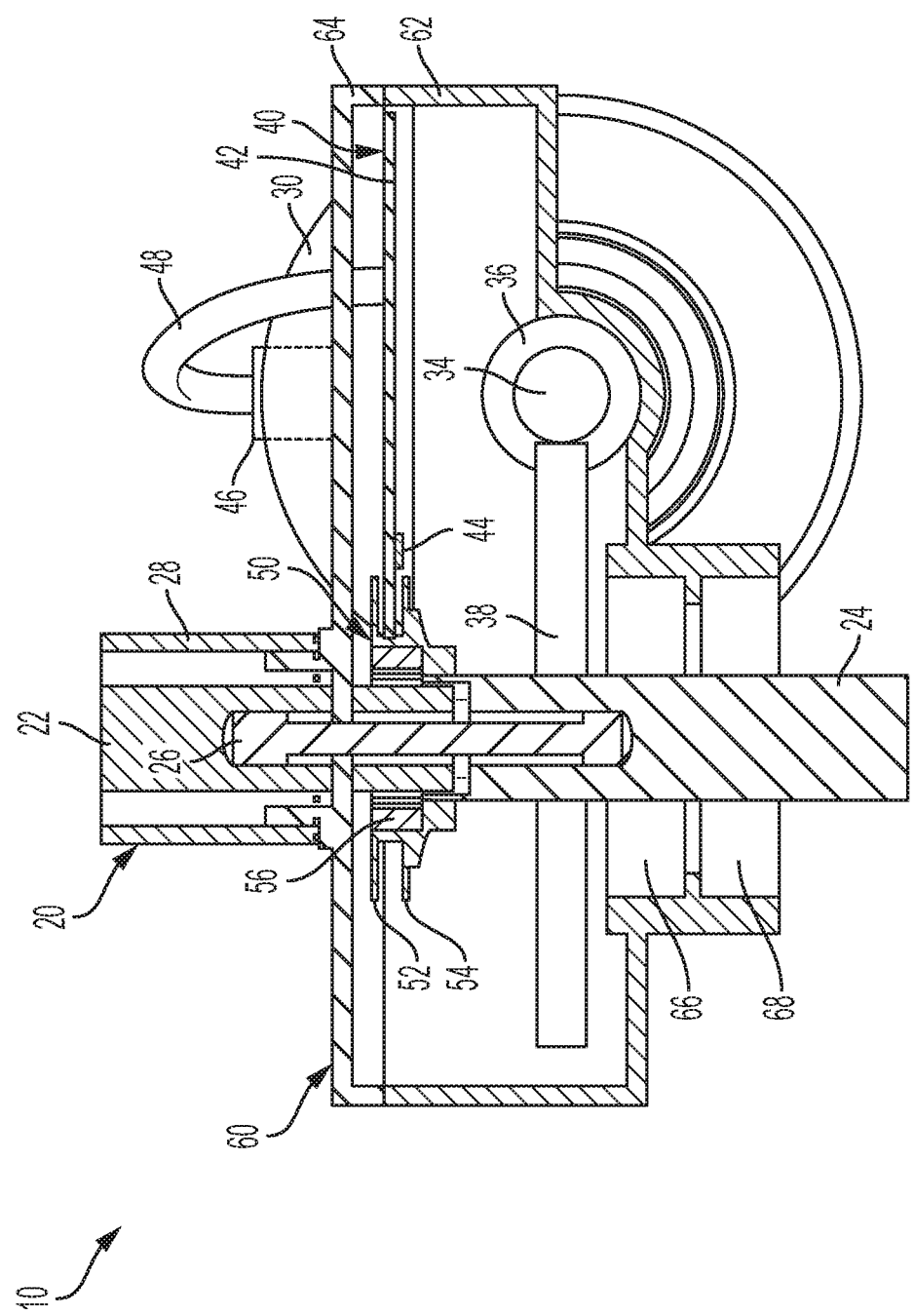
FIG. 1 is a cross sectional view of a motor assembly for an electric power steering system in accordance with some embodiments of the present disclosure.
Figure 2:
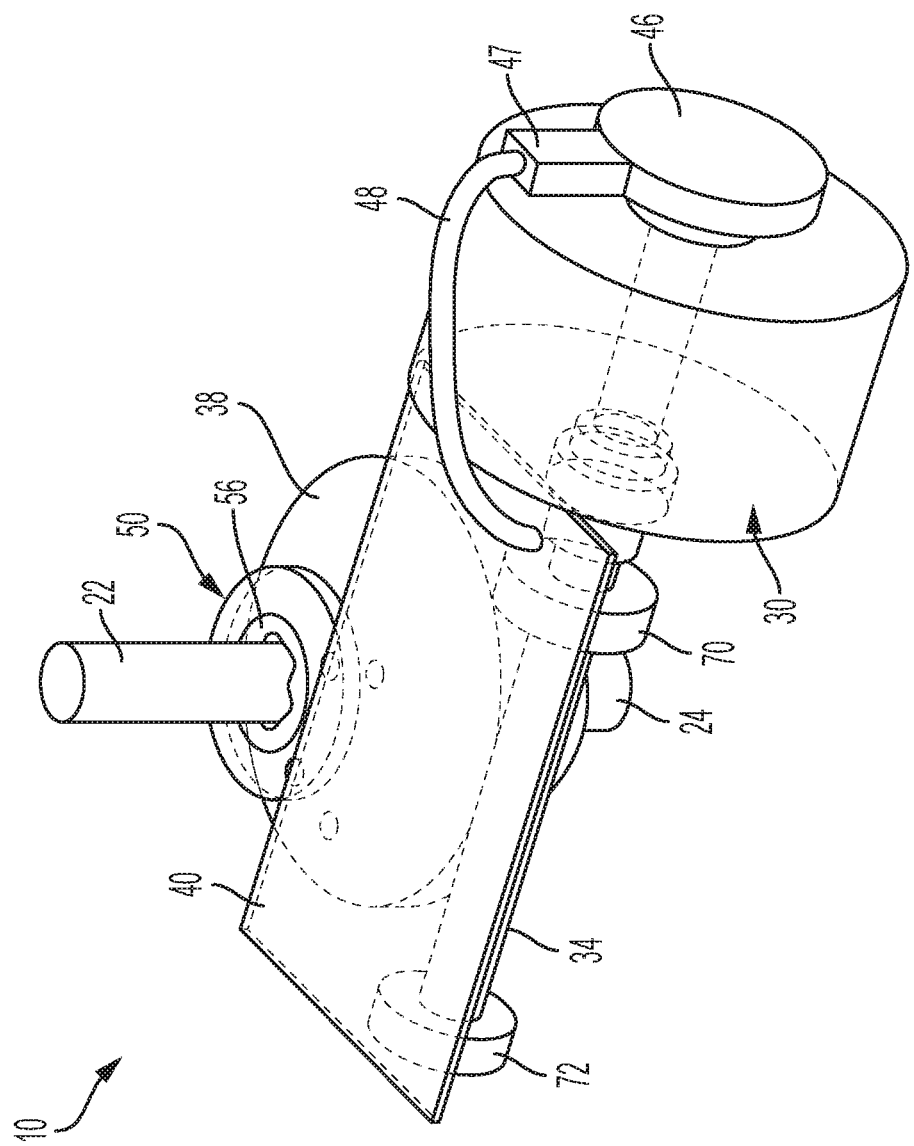
FIG. 2 is a perspective view of the motor assembly of FIG. 1.
Figure 3:
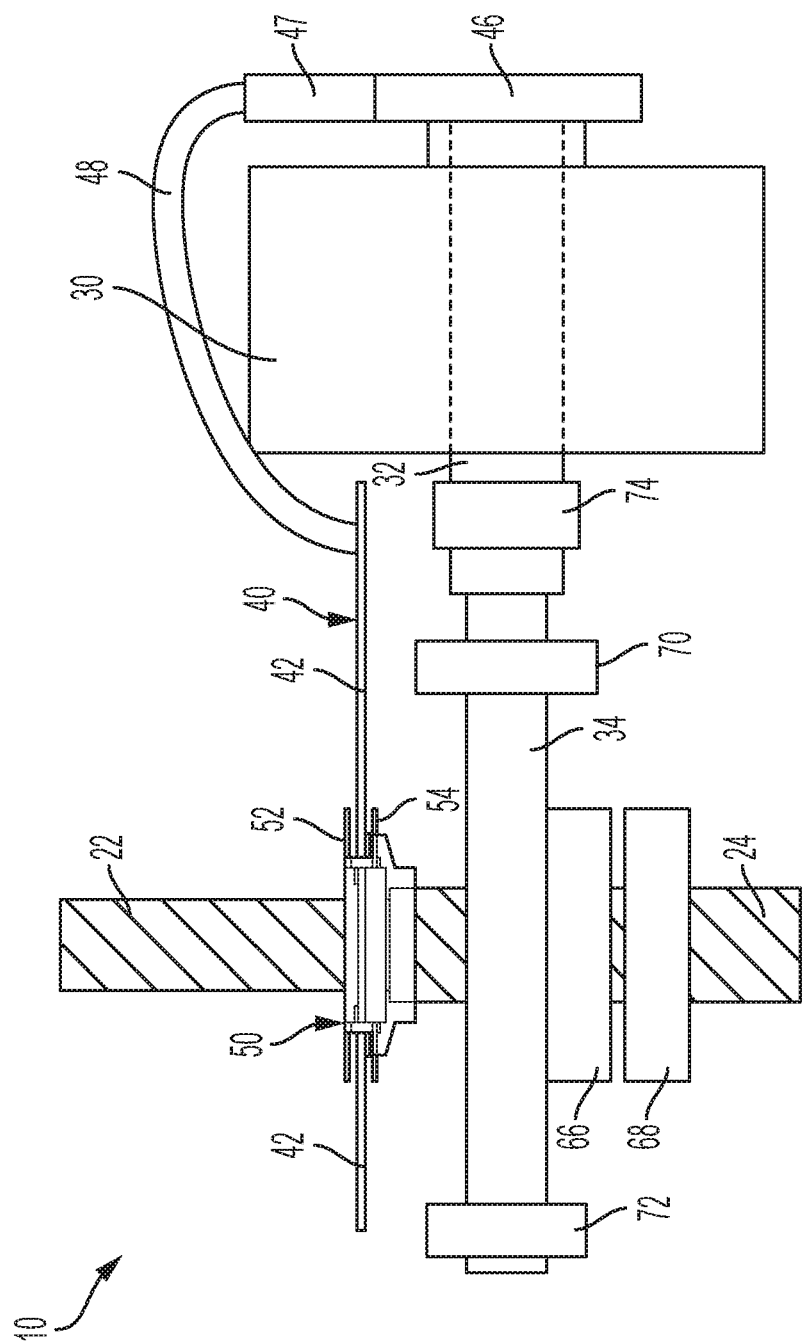
FIG. 3 is a side view of the motor assembly of FIG. 1.

FIGS. 1-3 show a first motor assembly 10 for an electric power steering (EPS) system of a vehicle in accordance with some embodiments of the present disclosure. Specifically, the first motor assembly 10 is configured to be attached to a steering column 20 that includes an input shaft 22 coupled to an output shaft 24 by a torsion bar 26. The input shaft 22 may be connected to a handwheel to be turned by an operator of the vehicle. The output shaft 24 may be connected to one or more road wheels for turning the vehicle. The torsion bar 26 may provide some degree of relative rotation between the input shaft 22 and the output shaft 24, and the relative rotation may be proportional to a torque applied between the input shaft 22 and the output shaft 24. Thus, measurement of the relative rotation between the input shaft 22 and the output shaft 24 can be used to determine the applied torque. The applied torque may be a function of a force applied to the handwheel and/or a rotational force transmitted by the output shaft 24 from one or more road wheels. A column tube 28 may surround one or more of the input shaft 22 and/or the output shaft 24. The column tube 28 may be fixed to a structural component of the vehicle.

The motor assembly 10 includes a motor 30 configured to rotate a motor shaft 32 to apply a drive torque to the output shaft 24. In some embodiments, the motor 30 may be a brushless type motor, such as a DC brushless motor. In some embodiments, the motor 30 may be a brushed type motor including brushes to convey power to a rotor. In some embodiments, the motor 30 may be an AC motor, such as a permanent magnet synchronous motor (PMSM). However, these are merely examples, and the motor 30 may include any type of electric motor.

The motor assembly 10 also includes a worm shaft 34 that is coupled to rotate with the motor shaft 32. The worm shaft 34 includes a worm 36 having a helical shape that engages a worm gear 38 coupled to the output shaft 24. Thus, the motor 30 is able to drive the output shaft 24 with a gear reduction and a change in driving direction provided by the worm and the worm gear 38.

The motor assembly 10 also includes a circuit card assembly (CCA) 40 including a printed circuit board 42 and a plurality of electrical components mounted to the printed circuit board 42. As shown in the FIGS., the printed circuit board 42 extends in a flat plane that is perpendicular to a rotational axis of the steering column 20, where the rotation axis of the steering column 20 is an axis about which the input shaft 22 and/or the output shaft 24 is configured to rotate. More specifically, the printed circuit board 42 extends perpendicularly to and adjacent to the input shaft 22. The printed circuit board 42 is parallel to and spaced apart from the worm shaft 34. The CCA 40 includes a torque and angle sensor chip 44 disposed on the printed circuit board 42 and configured to measure a differential angle between rotational positions of the input shaft 22 and the output shaft 24. The differential angle, as measured by the torque and angle sensor chip 44 can be used to determine an amount of twist of the torsion bar 26. Taken together with information regarding a characteristic of the torsion bar, the torque and angle sensor chip 44 can be used to determine a torque applied to either or both of the input shaft 22 and/or the output shaft 24.

The motor assembly 10 also includes a motor position sensor 46 configured to measure a rotational position of the motor shaft 32. By measuring the position of the rotor shaft 32, the position of the output shaft 24 can be determined with a high degree of accuracy. In some embodiments, and as shown in FIGS. 1-3, the motor position sensor 46 is coupled directly to the motor shaft 32, with the motor shaft 32 extending between the motor position sensor 46 and the worm shaft 34. The motor position sensor 46 includes a radial protrusion 47 which may be used for holding the motor position sensor 46 and/or for holding a wiring connection, such as a wiring receptacle. A flexible conductor 48 connects the motor position sensor 46 to the CCA 40 for transmitting information from the motor positon sensor 46 to a controller and/or a communications bridge located on the CCA 40. The flexible conductor 48 may also provide power from the CCA 40 to the motor position sensor 46. The flexible conductor 48 may include one or more wires, such as stranded or solid metal wire. Alternatively or additionally, the flexible conductor 48 may include a flexible circuit board or a ribbon cable having electrically conducive traces disposed along a length of flexible substrate.

A rotor assembly 50 includes a first rotor 52 coupled to the input shaft 22 and a second rotor 54 coupled to the output shaft 24. A rotor coupling 56 connects the first rotor 52 to the input shaft 22. The rotor coupling 56 may be keyed or otherwise configured to cause the first rotor 52 to rotate with the input shaft 22 while allowing the motor assembly 10 to be selectively attached or detached from the input shaft 22. The rotors 52, 54 are disposed parallel to and spaced apart from one another, with the CCA 40 extending therebetween. The torque and angle sensor chip 44 interacts with the rotors 52, 54 via electrical and/or magnetic fields in order to determine the relative rotational angle difference between the first and second rotors 52, 54, and thus the differential angle between the input shaft 22 and the output shaft 24.

In some embodiments, the CCA 40 also includes a handwheel angle sensor configured to measure an absolute angle of the input shaft 22. For example, the torque and angle sensor chip 44 or another device may measure an angular position of the first rotor 52, or another structure coupled to the input shaft 22, relative to a fixed reference that does not rotate with the input shaft 22 or the output shaft 24.

In some embodiments, the CCA 40 includes electronic components configured to control power supplied to the motor 30. For example, the CCA 40 may include power electronic devices, such as switching transistors, used to generate an AC or DC waveform that is supplied to the motor 30. Additionally or alternatively, the CCA 40 may include one or more controllers, such as a microprocessor, microcontroller, or application-specific integrated circuit (ASIC) configured to control the AC or DC waveform that is supplied to the motor 30. For example, the one or more controllers may control the motor 30 to produce an output torque based upon a calculated torque command. The one or more controllers may also determine the torque command based on the differential angle as measured by the torque and angle sensor chip 44. Thus, the motor assembly 10 may perform some or all of the core functions of the EPS system, and may be referred to as a "highly integrated EPS system".

The motor assembly 10 also includes an enclosure 60 coupled to the motor 30 and containing the CCA (40). In some embodiments, the motor 30 is disposed inside of the enclosure 60. Alternatively, the motor 30 may be disposed outside of the enclosure 60 or partially inside and partially outside of the enclosure 60. For example, the motor 30 may be bolted, screwed, or otherwise fixed to the enclosure 60. Specifically, the enclosure 60 includes a lower housing 62 and a cover 64. The enclosure 60 may be made of metal, such as steel, aluminum, or magnesium. However, some or all of the enclosure 60 may be made of other material, such as plastic. The worm shaft 34 and the worm gear 38 are each disposed, at least partially, within the enclosure 60.

As shown in FIG. 1, a first bearing 66 and a second bearing 68 are disposed within the lower housing 62 to support the output shaft 24. The first bearing 66 and the second bearing 68 may be any type of bearing including, for example, a ball bearing, a needle bearing, or a plain bearing. Either or both of the first or second bearings 66, 68 may be sealed or unsealed. One or more seals (not shown) may prevent contaminants from entering the enclosure 60 around the output shaft 24.

As shown in FIG. 3, a third bearing 70 and a fourth bearing 72 support the worm shaft 34 at or near each of the two ends thereof. The third bearing 70 and/or the fourth bearing 72 may be mounted to and supported by the enclosure 60. A coupling 74 connects the worm shaft 34 to the motor shaft 32 for transmitting torque therebetween. In some embodiments, the coupling 74 may include a resilient material for providing vibration isolation between the motor shaft 32 and the worm shaft 34. Alternatively, the coupling 74 may provide a rigid connection therebetween.

Figure 4:
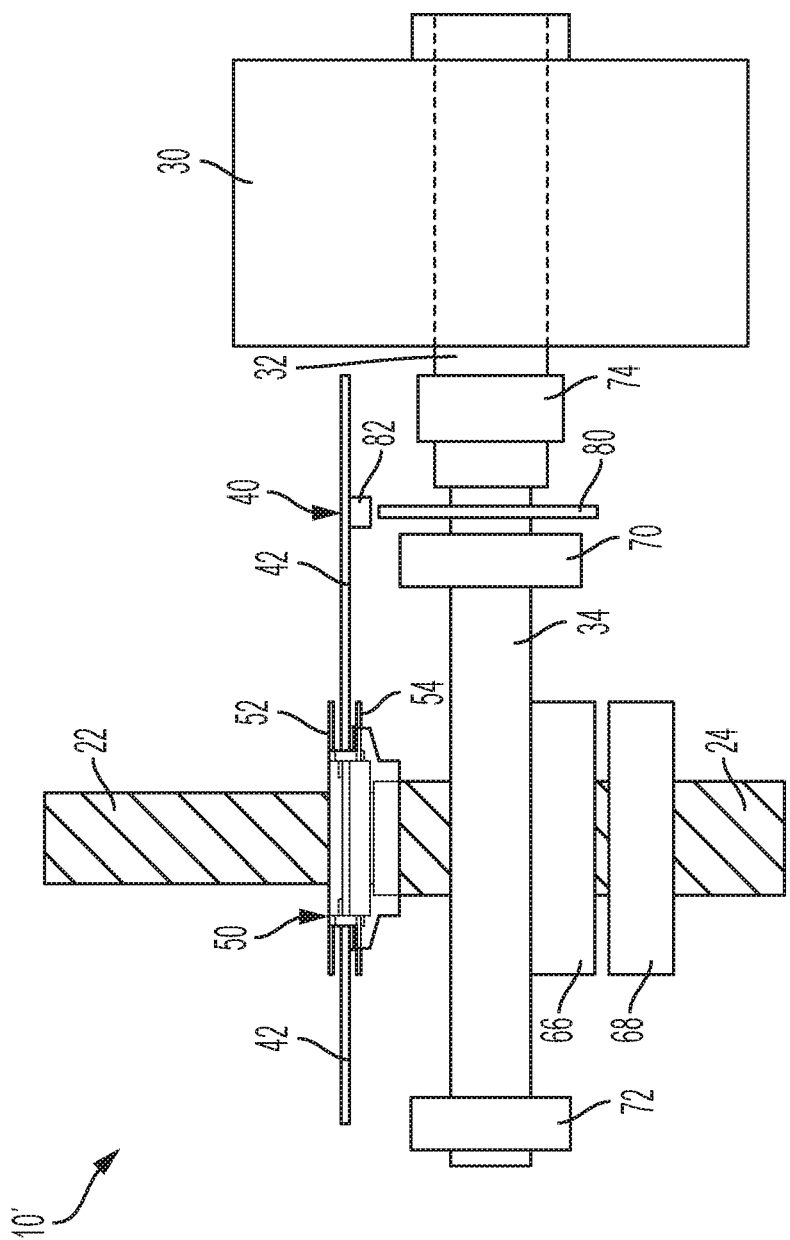
FIG. 4 is a side view of a motor assembly for an electric power steering system in accordance with some embodiments of the present disclosure.

FIG. 4 is a side view of a second motor assembly 10' for an EPS system in accordance with some embodiments of the present disclosure. The second motor assembly 10' shown in FIG. 4 is similar or identical to the first motor assembly 10 shown in FIGS. 1-3, except it does not include the motor position sensor 46 coupled directly to the motor shaft 32. Instead, a shaft position wheel 80 is configured to rotate with the motor shaft 32 and to be sensed by a position sensor 82 on the CCA 40. The shaft position wheel 80 may be disposed around the worm shaft 34, as shown in FIG. 4; alternatively, the shaft position wheel 80 may be disposed around the motor shaft 32. The position sensor 82 may measure a rotational position of the shaft position wheel by an electromagnetic interaction and/or by an optical signal, such as a light beam that is periodically interrupted as the shaft position wheel 80 is rotated.

Figure 5:
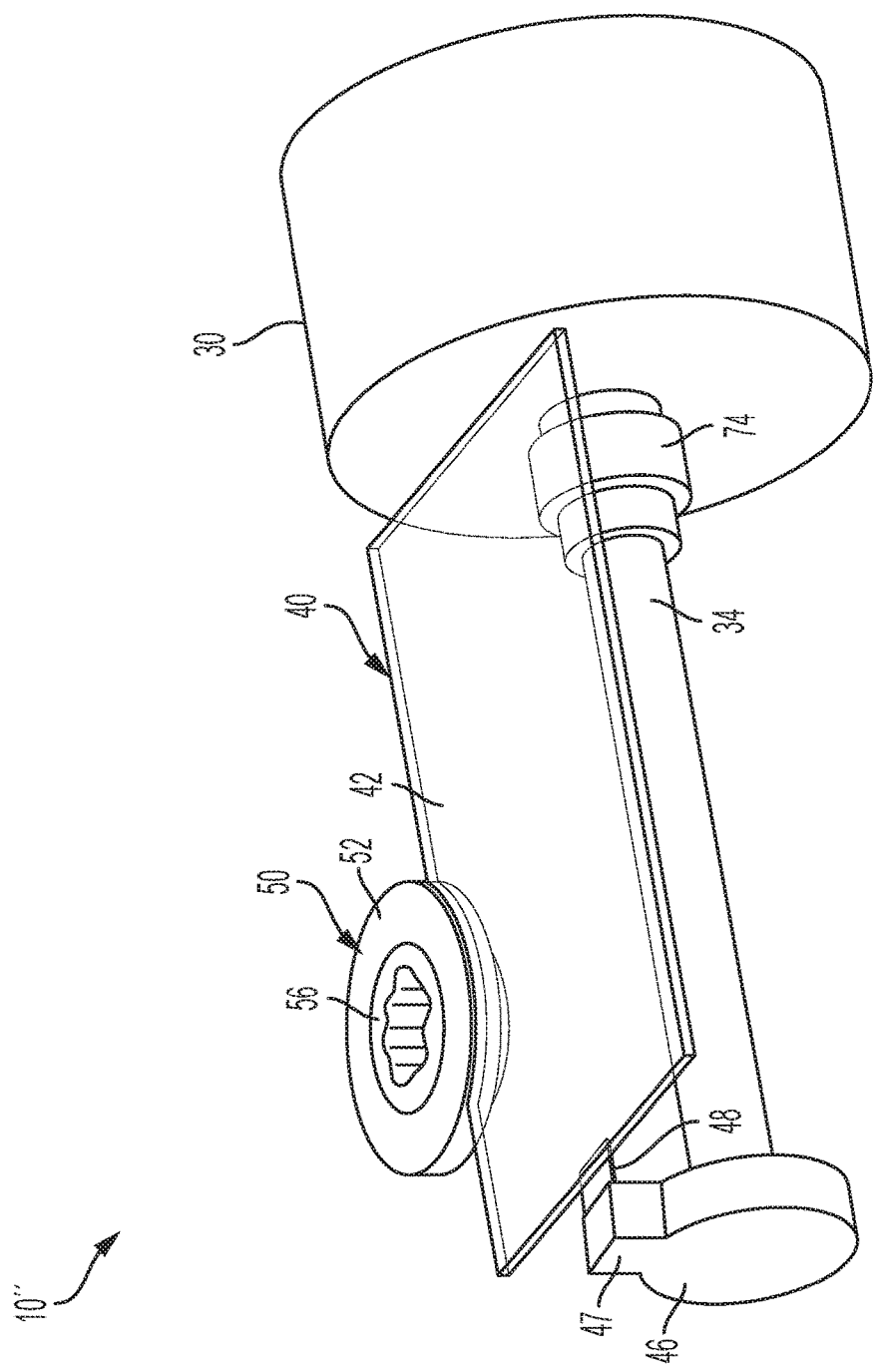
FIG. 5 is a perspective view of a motor assembly for an electric power steering system in accordance with some embodiments of the present disclosure.

FIG. 5 is a perspective view of a third motor assembly 10" for an EPS system in accordance with some embodiments of the present disclosure. The third motor assembly 10" shown in FIG. 5 is similar or identical to the first motor assembly 10 shown in FIGS. 1-3, except it does not include the motor position sensor 46 coupled directly to the motor shaft 32. Instead, the motor position sensor 46 is coupled to the worm shaft 34 opposite of the motor 30, with the worm shaft 34 extending between the motor shaft 32 and the motor position sensor 46.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

What is claimed is:

1. A motor assembly for an electric power steering system comprising:
   a motor configured to rotate a motor shaft to apply a drive torque to an output shaft of a steering column;
   a circuit card assembly including a torque and angle sensor disposed upon a printed circuit board and configured to measure a differential angle between rotational positions of the output shaft and an input shaft;
   a motor position sensor configured to measure a rotational position of the motor shaft; and
   a worm shaft coupled to the motor shaft and having a worm disposed helically thereabout and engaging a worm gear,
   wherein the motor position sensor includes a shaft position wheel disposed on the worm shaft between the motor and the worm gear, and
   wherein the printed circuit board of the circuit card assembly is disposed perpendicular to a rotational axis of the steering column.

2. The motor assembly of claim 1, wherein the circuit card assembly also includes a handwheel angle sensor configured to measure an absolute angle of the input shaft.

3. The motor assembly of claim 1, wherein the motor position sensor is spaced apart from the circuit card assembly and connected thereto by a flexible conductor.

4. The motor assembly of claim 1, further comprising:
   an enclosure containing the circuit card assembly and the worm shaft and the worm gear.

5. The motor assembly of claim 1, wherein the motor is a brushless type motor.

6. The motor assembly of claim 1, wherein the motor position sensor further includes a position sensor disposed on the circuit card assembly and configured to measure a rotational position of the shaft position wheel.

7. A motor assembly for an electric power steering system comprising:
   a motor configured to rotate a motor shaft to apply a drive torque to an output shaft of a steering column;
   an enclosure coupled to the motor and containing a circuit card assembly, the circuit card assembly including a torque and angle sensor disposed upon a printed circuit board and configured to measure a differential angle between rotational positions of the output shaft and an input shaft;
   a worm shaft coupled to rotate with the motor shaft, the worm shaft having a worm disposed helically thereabout for driving a worm gear coupled to the output shaft; and
   a motor position sensor in communication with the circuit card assembly and configured to measure a rotational position of the motor shaft,
   wherein the worm shaft and the worm gear are each disposed within the enclosure, and
   wherein the motor position sensor is attached to the motor shaft on a side of the motor opposite the worm shaft.

8. The motor assembly of claim 7, wherein the printed circuit board of the circuit card assembly is disposed perpendicular to a rotational axis of the steering column.

9. The motor assembly of claim 7, wherein the circuit card assembly also includes a handwheel angle sensor configured to measure an absolute angle of the input shaft.

10. The motor assembly of claim 7, wherein the motor position sensor is spaced apart from the circuit card assembly and connected thereto by a flexible conductor.

11. The motor assembly of claim 7, wherein the motor is a brushless type motor.

12. A motor assembly for an electric power steering system comprising:
    a motor configured to rotate a motor shaft to apply a drive torque to an output shaft of a steering column;
    a worm shaft coupled to rotate with the motor shaft and having a worm disposed helically thereabout and engaging a worm gear coupled to the output shaft;
    a coupling connecting the motor shaft to the worm shaft for transmitting torque therebetween;
    a bearing supporting the worm shaft between the coupling and the worm gear;
    a shaft position wheel disposed on the worm shaft between coupling and the bearing;
    a circuit card assembly including a torque and angle sensor disposed upon a printed circuit board and configured to measure a differential angle between rotational positions of the output shaft and an input shaft;
    a position sensor configured to measure a rotational position of the shaft position wheel.

13. The motor assembly of claim 12, further comprising an enclosure containing the circuit card assembly, the enclosure directly coupled to the motor.

14. The motor assembly of claim 13, wherein the worm shaft and the worm gear are disposed within the enclosure.

15. The motor assembly of claim 12, wherein the position sensor is disposed on the printed circuit board.

* * * * *